United States Patent
Pappas et al.

(10) Patent No.: US 8,140,651 B2
(45) Date of Patent: Mar. 20, 2012

(54) METHOD AND SYSTEM FOR SELF-ORGANIZING COMPUTER SYSTEMS

(75) Inventors: Vasileios Pappas, Elmsford, NY (US); Dinesh Chandra Verma, Mount Kisco, NY (US); Brian Michael Rivera, Columbia, MD (US); Ananthram Swami, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 12/115,644

(22) Filed: May 6, 2008

(65) Prior Publication Data
US 2009/0282132 A1 Nov. 12, 2009

(51) Int. Cl.
*G06F 15/16* (2006.01)
(52) U.S. Cl. ............... 709/221; 709/201; 709/205
(58) Field of Classification Search .......... 709/220–221, 709/201, 205
See application file for complete search history.

(56) References Cited

U.S. PATENT DOCUMENTS

| | | | |
|---|---|---|---|
| 6,553,405 B1* | 4/2003 | Desrochers | 709/203 |
| 6,570,872 B1* | 5/2003 | Beshai et al. | 370/369 |
| 6,636,781 B1* | 10/2003 | Shen et al. | 700/248 |
| 2007/0011485 A1* | 1/2007 | Oberlin et al. | 714/4 |
| 2008/0134164 A1* | 6/2008 | Stich et al. | 717/172 |
| 2009/0204702 A1* | 8/2009 | Jensen et al. | 709/224 |

* cited by examiner

*Primary Examiner* — David Lazaro
(74) *Attorney, Agent, or Firm* — Tutunjian & Bitetto, P.C.; Preston J. Young, Esq.

(57) ABSTRACT

A system and method to self-configure a distributed system includes obtaining a description of a distributed system which has a plurality of computing nodes, each node being capable of performing any of a plurality of tasks in the description. At each node, a persona of that node is determined in accordance with the description such that the nodes are assigned tasks in the distributed system. Each node is reconfigured in accordance with the persona such that the nodes are linked in the distributed system to provide a self-configured distributed system for performing at least one application.

25 Claims, 5 Drawing Sheets

METHOD AND SYSTEM FOR SELF-ORGANIZING COMPUTER SYSTEMS

GOVERNMENT RIGHTS

This invention was made with Government support under Contract No.: W911NF-06-3-0001 awarded by the U.S. Army Research Office (ARO). The Government has certain rights in this invention.

BACKGROUND

1. Technical Field

The present invention relates to distributed computer systems, and particularly to systems and methods for management of distributed computer systems.

2. Description of the Related Art

The management and operations of distributed computer systems and networks is a complex labor-intensive task that accounts for a large amount of work in current enterprises. The cost of managing operations and administration is a much larger percentage than the costs of procuring new hardware and software. In order to address these concerns, several approaches to promote autonomous and autonomic operations have been suggested. However, current computer devices and systems are presently unable to provide such capabilities.

SUMMARY

One of the goals envisioned for true autonomic computing is an environment where computers would be self-organizing and self-configuring. According to this vision, the complex information technology (IT) infrastructure needed for operations in a commercial data center or operational capabilities of a military outpost could be obtained simply by turning on generic machines at the site. The machines would take on a configuration and installation that is needed to fulfill the computing needs of that data center or the military outpost. Conventional computer systems are not capable of doing this. However, in accordance with the present principles, a method and system enable computer systems to have the desirable attributes of self-organization and self-configuration which are modeled after similar features in biological systems.

One goal of the systems described herein is to enable a scenario is which a fully functional distributed computing environment is set up dynamically and automatically in the field. The individual deploying the devices in the field takes an identical set of machines, identical in the sense that they all have the same set of hardware and software capabilities, and the individual simply sets the machines into the various locations as needed. If the communication among nodes needs wired connections, then the deploying individual sets up the wired connectivity, as needed. If the connectivity is wireless, then the deploying individual simply needs to power up the machines when they are in the appropriate locations. In some cases, the machines would be arranged at the appropriate locations due to the coming together of the vehicles, aircraft or ships that may include these machines. As the dynamics of the system change, the machines in the system can take on the role and responsibilities that are dictated by their location or a niche that needs to be occupied.

A few examples are described for types of useful and automatic deployments. One example is taken from a military deployment environment, and a second example is taken from a commercial data center environment.

Military Scenario: A military unit is deployed for operations in the field. The military unit includes soldiers with their handheld radios, vehicles with communication gear, servers which are responsible for maintaining operations at a base camp of the unit, a console which allows a unit commander to observe the position and situation of the different communications equipment, and some units which are able to communicate to headquarters using a satellite link. Some of the communication equipment serves the role of firewalls and intrusion detection units looking out for suspicious behavior. Other units serve in the role of a network monitor. Still other units serve as proxies for communication to the satellite to prioritize messages, while other units may act as infrastructure service providers, e.g., a domain name server or a directory server.

Normally, in present military units, the communications gear tends to be in specialized units, and the operation of the application on those units is configured manually, or otherwise hard-coded. During deployment, a technical person or a team of technical people needs to set up the network units and equipment. Since the specialized devices need to be available and can not typically be used for other purposes, it is not unusual to be in a situation where devices of one type (e.g., Ethernet switches) may be in short supply, while devices of another type (firewalls) may be in abundance, but procuring the devices that are not available may create a substantial time-lag.

Instead of the network being deployed and organized from inflexible specialized equipment, all the devices being deployed in the network are preferably homogenous and look identical and undifferentiated when they are deployed. Once the devices are switched on, the devices determine their role and function in the network automatically, and take on differentiated roles that enable them to optimally support the communications and networking needs of the unit they support.

Commercial Data Center Scenario: A commercial data center in current environments is a complex network of interworked devices. Among the different types of devices that are found in the data center, one can enumerate Internet protocol (IP) routers, firewalls, Ethernet switches, web servers, application servers, database servers, and storage devices such as disk arrays. Additionally, management servers, accounting servers, customer help-desk systems, as well as, audit compliance systems may be present to ensure smooth operation of the data center. As in the case of the military unit, many of these devices have specialized hardware or software functions, and can rarely be interchanged. In some cases, e.g., on servers, it is possible to manually install database software instead of application software, but the process is usually slow and cumbersome.

In the commercial data center, it is preferred to have an environment where a human administrator only needs to install a generic device in the data center for any function. The device looks at its position in the current environment, and automatically takes on the role of the specialized function that it should be performing in the data center based on its location in the overall hierarchy or its niche.

Handheld Device Scenario: A handheld device, e.g., a military radio, a cell-phone, or a personal digital assistant (PDA) tend to be specialized devices performing a single function. However, the number of such devices is always increasing, and it is not unusual to find multiple such devices on a single individual. Furthermore, most of these devices operate in a pure client mode—when we view a typical client-server mode of implementation of most applications.

Soldiers typically carry multiple pieces of electronic equipment with them. A typical set of devices carried by a soldier may include a field radio (to enable voice communication with others), a combat survival locator (to communicate location of a survivor to rescuers), an electronic map, a global positioning satellite (GPS) navigator, etc. Not all of these devices are needed at the same time, and a single PDA may be equipped to take on the form and function of the specialized electronic equipment that the soldier needs to take. In addition, the handheld devices do not merely provide client functionality, but they also can incorporate a server function. E.g., an iPhone™ in the pocket of a user can act as a web-server for a personal web-site, as well as the websites that have been contracted to run in an outsourcing engagement with some other businesses. A soldier in the battlefield may be running a fully functional website on his PDA so that the central command and control, as well as other soldiers in the operation, may observe the actions on the battlefield, and access the website to obtain a continuous feed.

Since a website tends to be run as a multi-tiered system of multiple applications and devices, providing functions of firewalls, web servers, application servers and data servers, among others, the PDA or other device in accordance with the present principles can be running a complete network of functions inside themselves. Depending on the needs of the environment, the PDA may switch its personality to operate a different type of network inside of the PDA or other device.

In addition to the above scenarios, one can envision many other examples in which the ability to deploy a single type of device, and have the device automatically take on a functional specialization needed to best support the environment would be useful. In most environments, having this capability would result in tremendous savings of labor as well as a reduction in the errors that are made when deploying complex configurations.

A system and method to self-configure a distributed system includes obtaining a description of a distributed system which has a plurality of computing nodes, each node being capable of performing any of a plurality of tasks in the description. At each node, a persona of that node is determined in accordance with the description such that the nodes are assigned tasks in the distributed system. Each node is reconfigured in accordance with the persona such that the nodes are linked in the distributed system to provide a self-configured distributed system for performing at least one application. The description may be predefined, based on device locations, based on random selection, based on a formula, etc.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
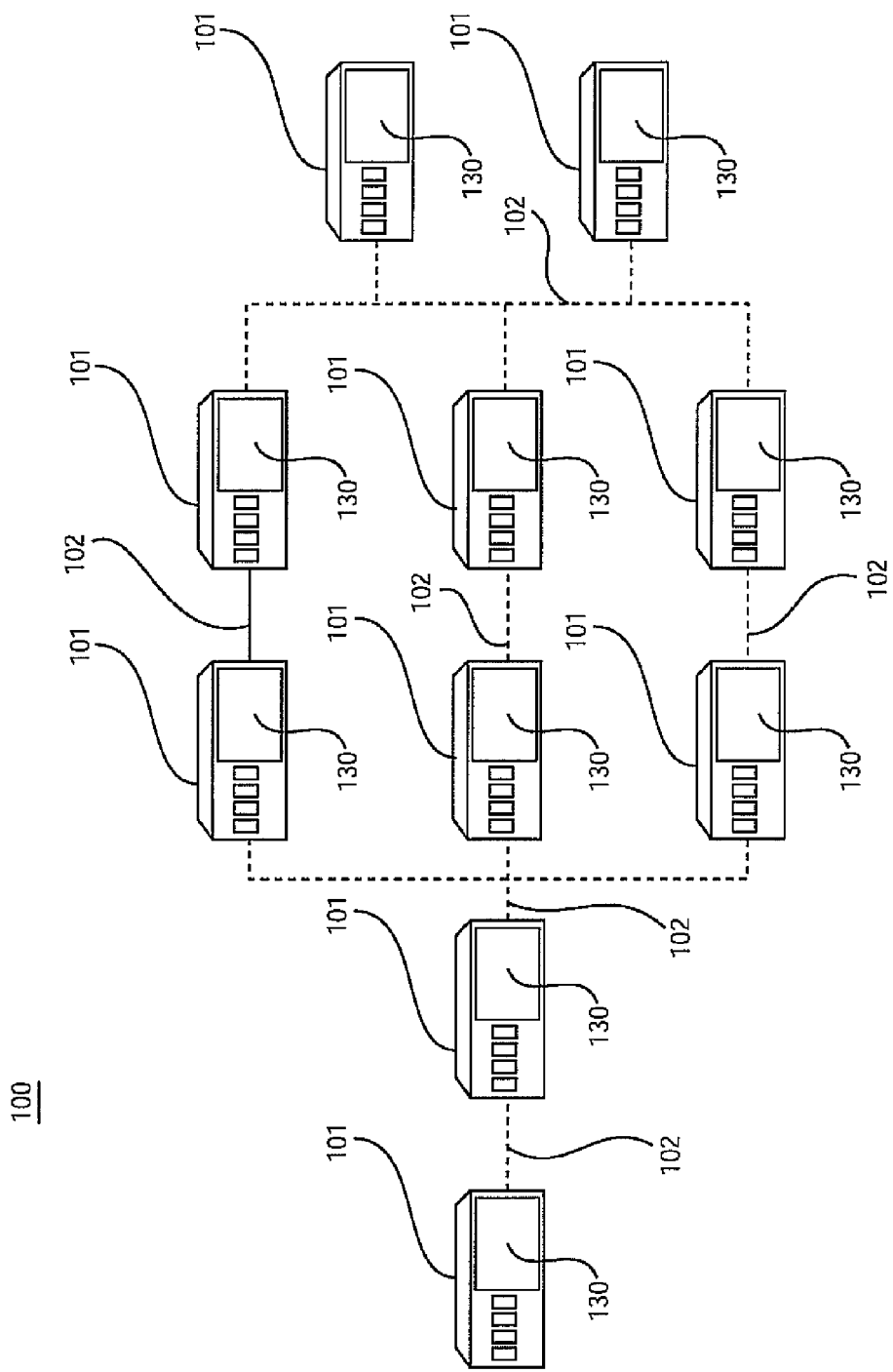
FIG. 1 is a block diagram representing an embodiment of a distributed system which can be made self-configuring.

The present embodiments are directed to developing systems in which a single type of device is deployed, and automatically takes a persona of different devices that are needed to perform different functions. Accordingly, these embodiments provide a system that is capable of taking on many different personas of different devices in accordance with a goal of establishing a distributed system. The present principles provide a way of specifying the characteristics of a distributed system that is desired for use in a plurality of flexible and reconfigurable applications, such as military operations, commercial operations, emergency scenarios or any other suitable use.

Systems and methods are provided for automatically configuring and reconfiguring the nodes in a distributed system so as to obtain desired characteristics of a distributed system. The distributed system includes a plurality of nodes each of which computes a persona needed to obtain the desired characteristic of a distributed system or environment. The characteristics are described in a system description which may employ, e.g., a mathematical formula mapping relative location of the node to a value, which can then be used to determine the persona needed for a node. Each node in the system can then reconfigure itself to obtain the desired persona.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The components of the system in accordance with the present principles may include or be part of a design for an integrated circuit chip, where for example, chips on a board can configure or reconfigure themselves to provide self-organization.

Referring now to the drawings in which like numerals represent the same or similar elements and initially to FIG. 1, a distributed system 100 is illustratively shown to demonstrate the present principles. The present embodiment provides a way in which a distributed system with desired characteristics can be obtained automatically with minimum intervention by a human operator. The distributed system 100 includes a plurality of nodes 101. The nodes include a communication device 130 which is employed to facilitate communication between the nodes 101. Communication channels 102 may be wired or wireless. Suitable communication protocols are known and available in the art. Suitable distributed systems for use in accordance with the present principles may include, but are not limited to communication networks among vehicles moving on a highway, communications among hand-held devices of a troop of soldiers that are going out on a foot patrol, systems monitoring the status and location of a herd of animals, communication networks among airplanes and a communication group formed among a set of company employees, systems installed in a data center and a system installed in branch offices of an enterprise. The actual nodes 101 in the system 100 may be disposed on one or more hardware platforms. Suitable hardware platforms include, but are not limited to, computing systems including mainframes, routers, personal computers, laptop computers, personal digital assistants, cellular phones, hand radios, etc. Each node 101 runs an instance of operating software that provides the necessary functionality including communication functionality for that node 101.

The configuration of the distributed system 100 is shown prior to an invocation of self-organizing methods in accordance with the present principles. The system 100 includes several identical or similarly equipped nodes 101. These nodes 101 are interconnected by means of communication links 102. These communications links 102 are shown as dashed lines to indicate that these links 102 may be wired or wireless and may connect to any or all of the other nodes 101 in accordance with a system description which will be provided and include information on how the nodes can be connected. Links 102 may be wired, wireless or may be a combination of wired and wireless links. The communication links 102 may be wireless network connections (e.g., IEEE 802.11b, 802.16, Bluetooth links, etc.), or wired network connections (e.g. Ethernet, token ring, SONET, MPLS, ATM links, etc.). Each of the nodes 101 has a similar structure including a generic hardware and software platform.

It should be understood that while the nodes 101 are described as identical, that such reference is for simplicity of explanation. While these nodes 101 can be identical, they are preferably compatible to permit communication therebetween and to provide the same functionality as the other nodes 101. In one embodiment, different hardware and/or software may be employed for different nodes as long as the different nodes are capable of performing all of the same tasks as the other nodes to permit the versatility needed and to permit the interchangeability of each node device without having to determine that device's capabilities. In one embodiment, each node is expected to be able to perform any of the tasks provided for in a system description.

Figure 2:
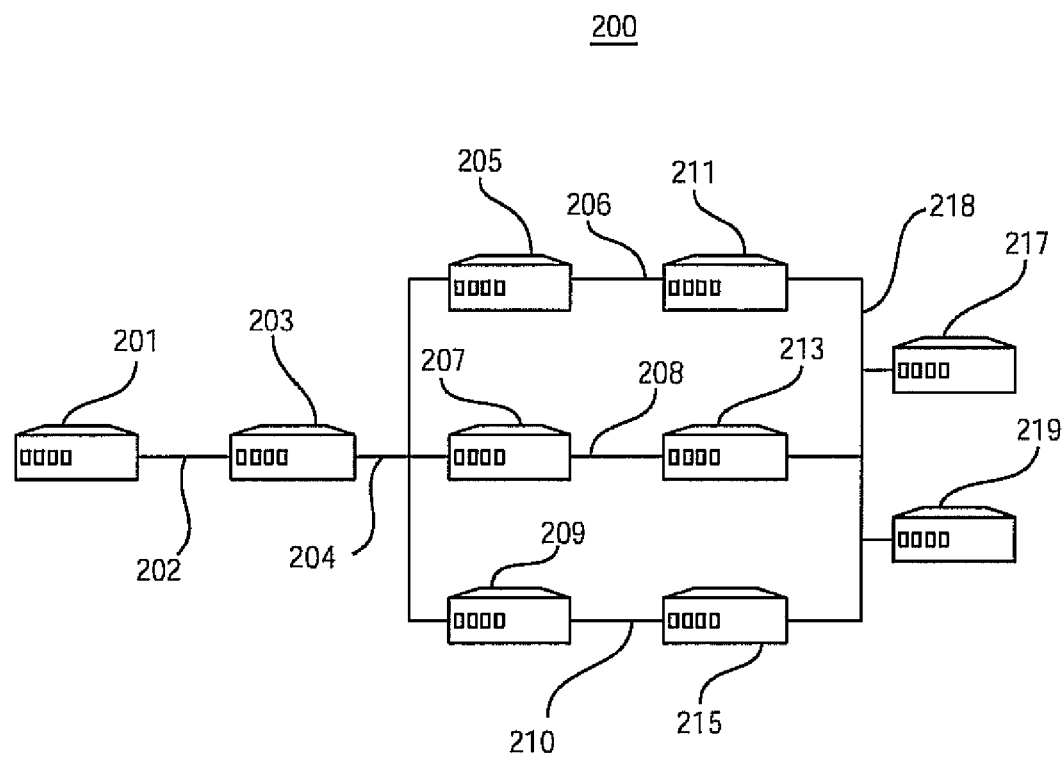
FIG. 2 is a block diagram representing an embodiment of a distributed system after self-configuration is completed.

Referring to FIG. 2, a self-organizing method is applied to system 100 of FIG. 1 to provide the configuration of FIG. 2. A structure of a distributed system 200 includes interconnections of different nodes 201, 203, 205, 207, 209, 211, 213, 215, 217, and 219, as shown in FIG. 2. Each of the nodes is reconfigured to have a different set of software functions as well as an appropriate configuration for that node. Each such configuration of different software functions is defined as a persona. Node 201 has the persona of a firewall; node 203 has the persona of a load balancer (LB); nodes 205, 207 and 209 have the persona of a web server; nodes 211, 213 and 215 have the persona of an application (app) server; and node 217 and node 219 have the persona of database (DB) servers.

Figure 3:
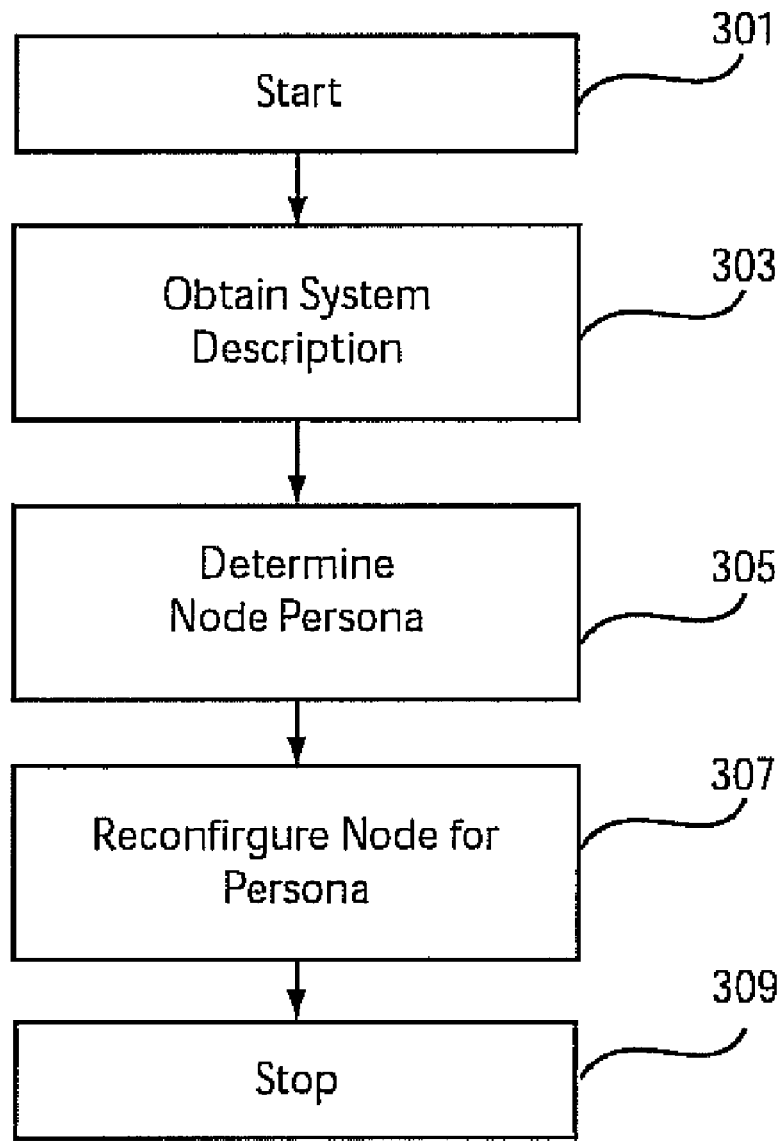
FIG. 3 is a block/flow diagram illustrating a system/method of self-configuration of a distributed system that is executed within a node in the system.

The different nodes are connected by a variety of communication links. These communications links are shown as link 202 which connects nodes 201 and 203, link 204 which connects node 203 with nodes 205, 207 and 209, respectively, link 206 which connects node 205 with node 211, link 208 which connects node 207 with node 213, link 210 which connects node 209 with node 215 and link 218 which connects nodes 211, 213, 215, 217 and 219 respectively. To have the nodes automatically take on the persona desired of a distributed system 200, a procedure or method is executed by each of the nodes in the distributed system 200. An illustrative method is shown in FIG. 3, which is invoked by each of the nodes in the distributed system 100 (or 200) anytime it is started up, when its position changes relative to other nodes in the system or when a reconfiguration of the system is called for in accordance with the rules or constraints on the system. The change in relative position may happen due to a relocation of a node manually by another entity, or due to movement of the node as in the case of a mobile ad-hoc network.

Referring to FIG. 3, a node enters a self-configuration operation in block 301. The node then, first executes block 303 to obtain a description of the system. The description describes the distributed system for which the node is a part. The description of the distributed system may be obtained in a variety of ways. One method includes for a description to be stored on a disk or memory of the node as a precursor step and the node retrieves that description from the memory. Another method may be for such a description to be provided to a node by a remote service in the manner that a Dynamic Host Configuration Protocol (DHCP) server provides nodes with their IP address and configuration information in the current state of the art. The description of the distributed system may also be provided by a concise mathematical formula as described hereinafter.

Having retrieved the description of the distributed system in block 303, the node performs block 305 to determine its persona in the distributed system. This may be set forth in the description and/or may be based on set criteria or environmental conditions. For example, a node closest to several other nodes may best be employed as a memory storage node to reduce latency, or a node located outdoors may be best suited for weather monitoring, etc. The persona may be location dependent or assigned randomly to each node. After determining its persona, the node reconfigures itself in block 307 so as to obtain the software configuration desired for the new persona. The method then terminates in block 309. In one embodiment, each node in the distributed system may have a structure like the one shown in FIG. 4.

Figure 4:
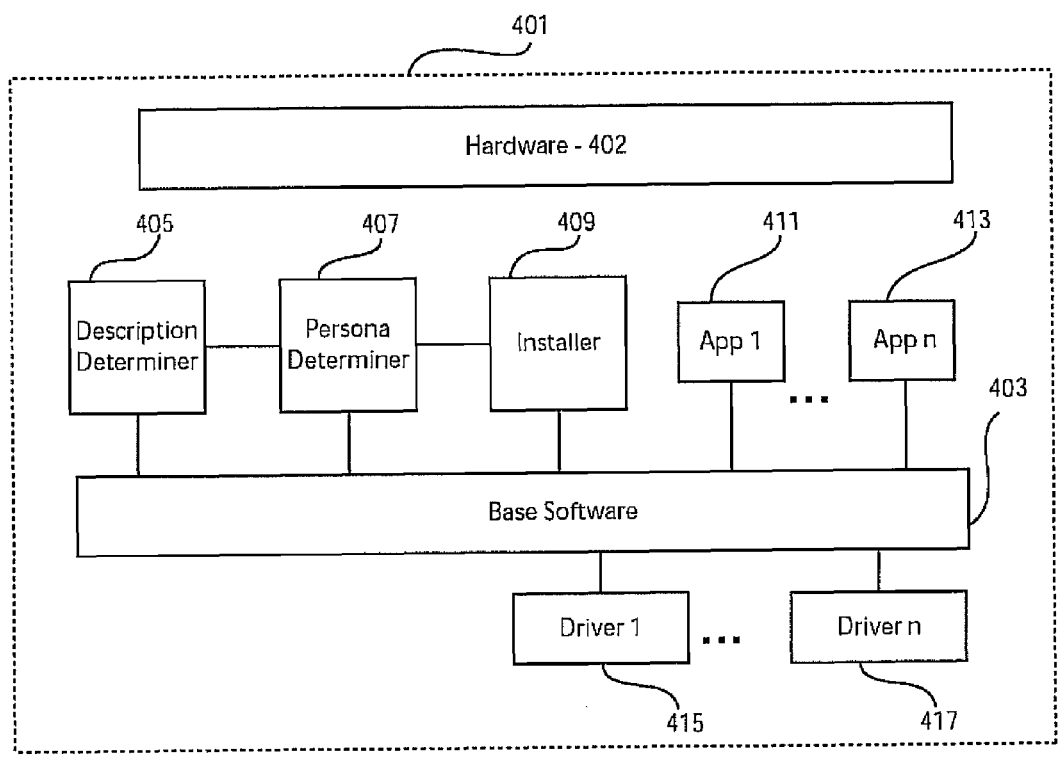
FIG. 4 is a block/flow diagram representing a node which implements a method for self-configuration.

Referring to FIG. 4, a node 401 includes a generic hardware platform 402 and a generic software platform 403. The generic software platform 403 is capable of supporting several applications 411, 413, etc. and device drivers 415, 417, etc., some of which may be pre-installed with the generic software platform 403, and others may be installed as needed. The node 401 further includes description determination software 405 that determines a description of the distributed system to which the node belongs. This description may be preloaded or downloaded at initiation of the self-configuration method.

The node 401 includes persona determination software 407 that determines the persona the node should take. Installer software 409 reconfigures the node to have the state identified in the system. The description determiner software 405 provides the description of the distributed system to the persona determiner software 407, which in turn, provides the persona identified for the node 401 to the installer software 409. The installer software installs a set of applications 411, 413 and a set of device drivers 415, 417 to reconfigure the node 401.

The description of the distributed system can be performed in a variety of ways. In one embodiment, the description can be provided by a potential function. A potential function is a mathematical formula that describes a numerical value as a function of a distance parameter, d. An example mathematical function could be: potential=$5d^3+3d^2+2d$ or potential=$3e^{-2d}$ where e is the base of the natural logarithm. The distance parameter may be any number of variables including, distance to a reference point, location (GPS), proximity to other nodes, latency delay between other nodes, a distance computed from a combination of different variables/parameters, etc.

The description determiner 405 can be preconfigured with a value of the potential function, or obtain the potential function from a server on the network by broadcasting a query for the same. In one embodiment, the persona determiner 407 runs a distributed method to determine the distance parameter, d, for a node. In one embodiment, a selected node may be assigned a pre-determined distance parameter such as 0. Each node then finds the distance parameter of the nodes it is connected to, and computes its distance parameter as that of the lowest parameter of all the neighbors plus a distance value associated with its link to the neighbor with the lowest distance parameter. The distance value associated with the link could be a constant, or a value reflecting the latency or performance of that link. The persona determiner 407 then applies a threshold value to the potential function corresponding to the computed distance metric. If the value of the potential is above one threshold, but below another threshold, then the first persona is applied. Similarly, for each persona, a similar set of thresholds can be defined. The persona defines the entire set of applications and device drivers, as well as any other piece of capability the node should have.

Other methods may be employed for determining which nodes get assigned which tasks. For example, random numbers may be generated for each node, at each node, and ranked. Job tasks/assignments may also be ranked. In one embodiment, the node with the highest (or lowest) random number is assigned the first task, the node with the second highest (or lowest) random number is assigned the second task, and so on. In still another embodiment, environmental conditions may be employed to assign or bias the assignment of tasks to nodes. For example, a node closest to an object (e.g., an antenna, or a troop unit) may be assigned a task in accordance with its beneficial location.

Figure 5:
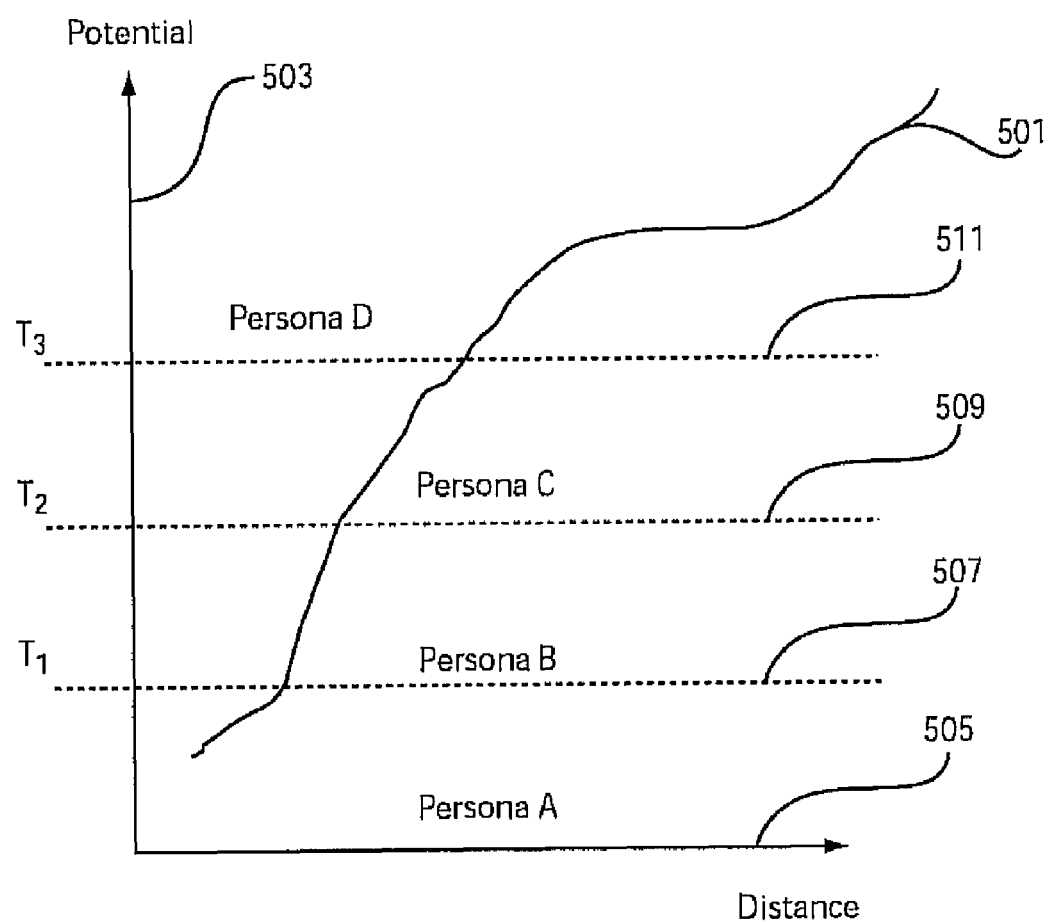
FIG. 5 is a diagram representing a graph used in conjunction with a mathematical formula for describing personas in a distributed system description.

Referring to FIG. 5, one illustrative manner for the computation of the potential function and the assignment of thresholds to determine the personas is illustratively shown. The axes for showing the potential are a distance metric axis 505 and a potential axis 503. The potential function 501 plots the potential as a function of distance. Threshold levels are defined at level $T_1$, $T_2$ and $T_3$ shown by dotted lines 507, 509 and 511 respectively. The node whose persona determiner (407) finds the value to be less than $T_1$ takes on the persona A. The node whose persona determiner finds the potential value to be between $T_1$ and $T_2$ takes on the persona B. The node whose persona determiner finds the value to between $T_2$ and $T_3$ takes on the persona C. The node whose personal determiner finds the potential value to be above $T_3$ takes on the persona D. Each persona corresponds to a different set of applications and device drivers.

Alternative embodiments may have other ways of organizing the system, e.g., the system may be described by a graph topology assigning personas to each of the topology elements, and the node persona determiner determines which of the topology elements the node corresponds to. Instead of a single numeric value of potential, the potential can be a multi-dimensional value, and the thresholding operation during persona determination can be replaced by performing another type of mathematical operation on the multi-dimensional value.

Having described preferred embodiments of a system and method for self-organizing computer systems (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method to self-configure a distributed system, comprising:
   obtaining a description of a distributed system which includes a plurality of computing nodes, each node being capable of performing any of a plurality of tasks in the description;
   at each node, determining a persona of that node in accordance with the description such that each node applies a mathematical formula to compute a value for selecting at least one task or at least one portion of a task in the description that is to be performed at that node; and
   reconfiguring persona assignments among the nodes to consider dynamic changes of the nodes in the distributed system, wherein the nodes are linked in the distributed system to provide a self-configured distributed system for performing at least one application.

2. The method as recited in claim 1, wherein determining further comprises:
   applying at least one threshold to the value to assign a task in accordance with the threshold.

3. The method as recited in claim 2, wherein the formula includes a potential function and the value is computed by the potential function.

4. The method as recited in claim 3, wherein multiple thresholds are defined which divide a value range into a plurality of subset ranges.

5. The method as recited in claim 4, wherein each subset range is associated with a different persona that is to be assigned to a node if the value falls within the subset range.

6. The method as recited in claim 5, further comprising plotting the value using the potential function to determine the subset range and corresponding persona that are associated with the value.

7. The method as recited in claim 1, wherein reconfiguring further comprises installing software on the node in accordance with the persona of the node.

8. The method as recited in claim 1, wherein obtaining further comprises:
specifying a topology of a graph characterizing the distributed system; and
assigning different personas to each node in accordance with the topology of the graph.

9. The method as recited in claim 8, wherein determining further comprises associating the node with an element in the topology of the graph based upon information about the node.

10. The method as recited in claim 1, wherein determining includes employing environmental conditions in determining the persona of the node.

11. A non-transitory computer readable storage medium comprising a computer readable program to self-configure a distributed system, wherein the computer readable program when executed on a computer causes the computer to perform the steps of:
obtaining a description of a distributed system which includes a plurality of computing nodes, each node being capable of performing any of a plurality of tasks in the description;
for each node, determining a persona of that node in accordance with the description such that each node applies a mathematical formula to compute a value for selecting at least one task or at least one portion of a task in the description that is to be performed at that node; and
reconfiguring persona assignments among the nodes to consider dynamic changes of the nodes in the distributed system, wherein the nodes are linked in the distributed system to provide a self-configured distributed system for performing at least one application.

12. A method to self-configure a distributed system, comprising:
providing a plurality of computing nodes, each node being capable of performing any of a plurality of tasks in a system description;
initiating communications between the nodes to begin self-configuration of the distributed system;
obtaining the system description for a distributed system to perform a particular application;
at each node, determining a persona of that node in accordance with the description such that each node applies a mathematical formula to compute a value for selecting at least one task or at least one portion of a task in the system description that is to be performed at that node; and
reconfiguring persona assignments among the nodes to consider dynamic changes of the nodes in the distributed system, wherein the nodes act together in a self-configured distributed system for performing at least one application.

13. The method as recited in claim 12, wherein determining further comprises:
applying a threshold to the value to assign a task in accordance with the threshold.

14. The method as recited in claim 13, wherein the formula includes a potential function and the value is computed by the potential function.

15. The method as recited in claim 12, wherein reconfiguring further comprises installing software on the node in accordance with the persona of the node.

16. The method as recited in claim 12, wherein obtaining further comprises:
specifying a topology of a graph characterizing the distributed system; and
assigning different personas to each node in accordance with the topology of the graph.

17. The method as recited in claim 16, wherein determining further comprises associating the node with an element in the topology of the graph based upon information about the node.

18. The method as recited in claim 12, wherein determining includes employing environmental conditions in determining the persona of the node.

19. A non-transitory computer readable storage medium comprising a computer readable program to self-configure a distributed system, wherein the computer readable program when executed on a computer causes the computer to perform the steps of:
initiating communications between a plurality of computing nodes, each node being capable of performing any of a plurality of tasks in a system description, to begin self-configuration of the distributed system;
obtaining the system description for a distributed system to perform a particular application;
for each node, determining a persona of that node in accordance with the description such that each node applies a mathematical formula to compute a value for selecting at least one task or at least one portion of a task in the system description that is to be performed at that node; and
reconfiguring persona assignments among the nodes to consider dynamic changes of the nodes in the distributed system, wherein the nodes act together in a self-configured distributed system for performing at least one application.

20. A self-configuring distributed system comprising:
a plurality of nodes, wherein each node includes memory storage media and is capable of performing any of a plurality of tasks in a system description;
each node including:
a description determination module that, when executed by a processor from a non-transitory computer readable storage medium, is configured to determine a structure of the distributed system using the system description;
a persona determination module configured to apply a mathematical formula to compute a value for determining a persona of the node such that at least one task or at least one portion of a task in the system description is selected to be performed at the node; and
an installer module that, when executed by a processor from a non-transitory computer readable storage medium, is configured to reconfigure a persona assigned to the node based on dynamic changes of the nodes in the distributed system, wherein the node is reconfigured in accordance with the system description and the persona of the node.

21. The system as recited in claim 20, wherein a threshold is applied to the value to assign a task to the node relative to the threshold.

22. The system as recited in claim 21, wherein the formula includes a potential function and the value is computed by the potential function.

23. The system as recited in claim 20, wherein the distributed system is specified using a topology of a graph, and nodes are assigned personas in accordance with the topology of the graph.

24. The system as recited in claim 23, wherein the persona is determined using environmental conditions of the node.

25. The system as recited in claim 20, wherein the persona includes one of a firewall, a database, a server, and a load balancer.

* * * * *